United States Patent [19]
Tuttle et al.

[11] Patent Number: 5,778,309
[45] Date of Patent: *Jul. 7, 1998

[54] GAIN ADJUSTMENT METHOD IN TWO-WAY COMMUNICATION SYSTEMS

[75] Inventors: John R. Tuttle; Charles K. Snodgrass, both of Boise, Id.

[73] Assignee: Micron Technology, Inc., Boise, Id.

[*] Notice: The term of this patent shall not extend beyond the expiration date of Pat. No. 5,613,228.

[21] Appl. No.: 726,612

[22] Filed: Oct. 7, 1996

Related U.S. Application Data

[63] Continuation of Ser. No. 430,711, Apr. 27, 1995, Pat. No. 5,613,228, which is a continuation of Ser. No. 206,471, Mar. 3, 1994, abandoned, which is a continuation of Ser. No. 909,370, Jul. 6, 1992, abandoned.

[51] Int. Cl.$^6$ .................................................. H04B 1/02
[52] U.S. Cl. .................. 455/127; 455/38.3; 455/70; 455/92; 340/825.06; 340/539
[58] Field of Search .................. 455/15, 32.1, 38.2, 455/38.5, 38.3, 67.1, 68, 69, 70, 72, 88, 92, 115–117, 126, 127, 343; 340/825.06, 825.03, 533, 537, 539; 375/345

[56] References Cited

U.S. PATENT DOCUMENTS

| | | | |
|---|---|---|---|
| 3,986,119 | 10/1976 | Hemmer, Jr. et al. | 455/15 |
| 4,741,018 | 4/1988 | Portratz et al. | 455/72 |
| 4,811,421 | 3/1989 | Havel et al. | 455/126 |
| 4,868,795 | 9/1989 | McDavid et al. | 455/69 |
| 5,003,619 | 3/1991 | Morris et al. | 455/127 |
| 5,220,678 | 6/1993 | Feei | 455/127 |
| 5,278,992 | 1/1994 | Su et al. | 455/67.1 |
| 5,613,228 | 3/1997 | Tuttle et al. | 455/127 |

*Primary Examiner*—Chi H. Pham
*Attorney, Agent, or Firm*—Henri J. A. Charmasson; Robert J. Stern

[57] ABSTRACT

A method for reducing the dynamic range required of a receiver circuit in a remote transceiver in 2-way communication between local and remote transceivers. By repeatedly transmitting a signal with successively increasing power from one transceiver until a response is received from the other transceiver, the dynamic range and hence complexity of the receiving circuit may be greatly reduced. The operating power of the remote transmitter can then be adjusted according to the level used by the local transmitter, thereby promoting the efficent use of the remote's power supply.

10 Claims, 3 Drawing Sheets

GAIN ADJUSTMENT METHOD IN TWO-WAY COMMUNICATION SYSTEMS

This application is a continuation of application Ser. No. 08/430,711 filed Apr. 27, 1995 now U.S. Pat. No. 5,613,228, which is a continuation of application Ser. No. 08/206,471 filed Mar. 3, 1994, now abandoned, which is a continuation of application Ser. No. 07/909,370 filed Jul. 6, 1992, now abandoned.

FIELD OF THE INVENTION

This invention relates to 2-way RF data communication between transceivers, specifically to automatic gain control (AGC) in receiver circuits of such transceivers, and more particularly, to the efficient use of the limited power and space available to such transceivers when used as radio frequency identification tags.

BACKGROUND OF THE INVENTION

Often times a given transceiver system is required to operate under widely varying conditions. When the distance between local and remote transceivers varies greatly, the power required to communicate varies accordingly. In the far field, the power required is dictated by the inverse square law: ideally, every time the distance is doubled the power required must be quadrupled. Other factors also impinge on the ability of two transceivers to communicate. Multipath and outside RF source interference can further effect the required transmission level.

In the field of remote transceivers of the type used in RFID tags, there is the added design constraint of package size, available power, and cost. Typically, RFID tags must be small and light-weight, about the size of your average Wheat Thin. Often, this requires the transceiver circuitry be incorporated into a single integrated circuit chip with a very small battery as a power supply.

To conserve the limited power afforded by a small battery, signal transmissions should be as efficient as possible. The tag should use as little power as possible during non-communicating operation. Simpler circuit design dissipates less power and is cheaper to construct.

SUMMARY OF THE INVENTION

The principal and secondary objects of this invention are to provide a method by which the efficiency in communication between local and remote RF transceivers can be further maximized and to reduce complexity of AGC circuits required in the receiver portions of remote transceivers.

These and other objects are achieved by sending successively stronger transmissions from the local transceiver (interrogator) trying to establish the communications link, beginning with minimum power, until a response is received from the remote transceiver (tag). The remote transceiver may use information in the signal received in order to decide on the power level used by its transmitter.

Optimally, the tag should remain in a quiescent sleep state using little power during periods of non-communication. When the tag is close to the interrogator, it will wake up from this state when the interrogator transmits at a relatively low power level. When the distance between tag and interrogator is large, the tag will awaken when the interrogator transmits at a relatively high power level. However, the power of the signal received by the tag will be about the same, whether near or far, thus reducing the flexibility required by the tag's receiver circuitry.

DESCRIPTION OF THE PREFERRED EMBODIMENTS OF THE INVENTION

Figure 1:
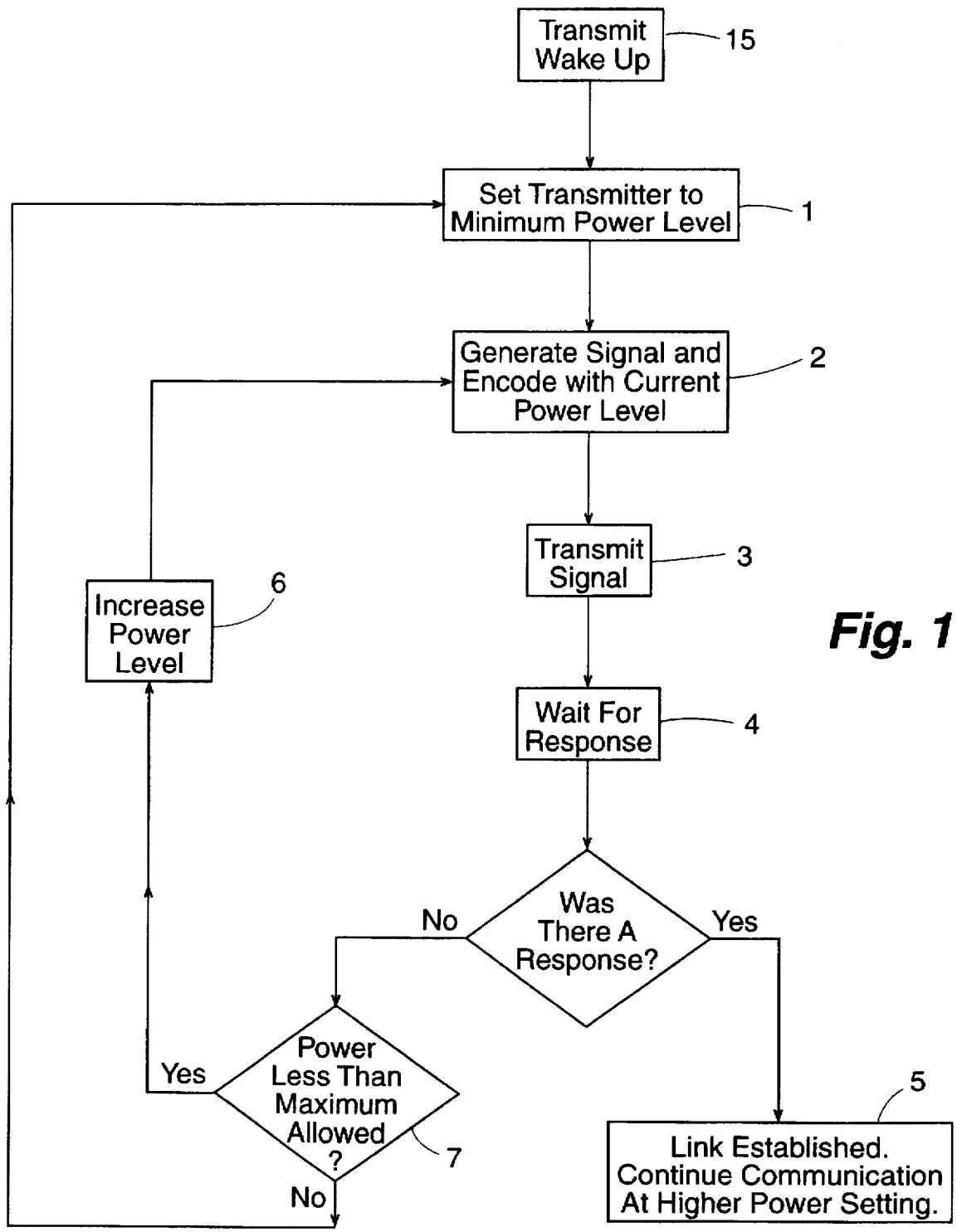
FIG. 1 is a flow chart diagram of the steps taken by the local interrogator transceiver to establish a communication link at an efficient power level.
Figure 3:
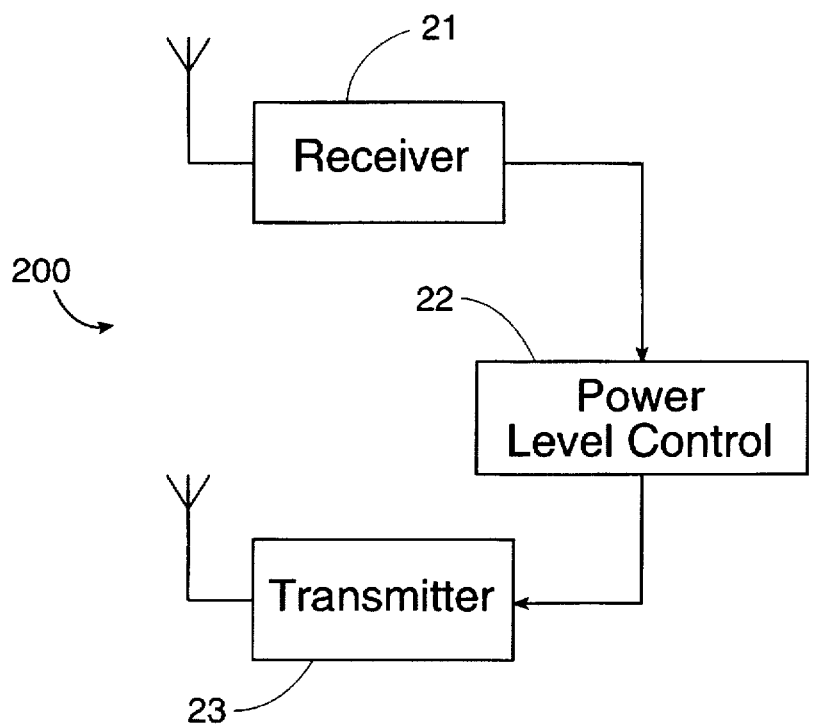
FIG. 3 is a block diagram of a remote RFID tag transceiver according to the invention.
Figure 4:
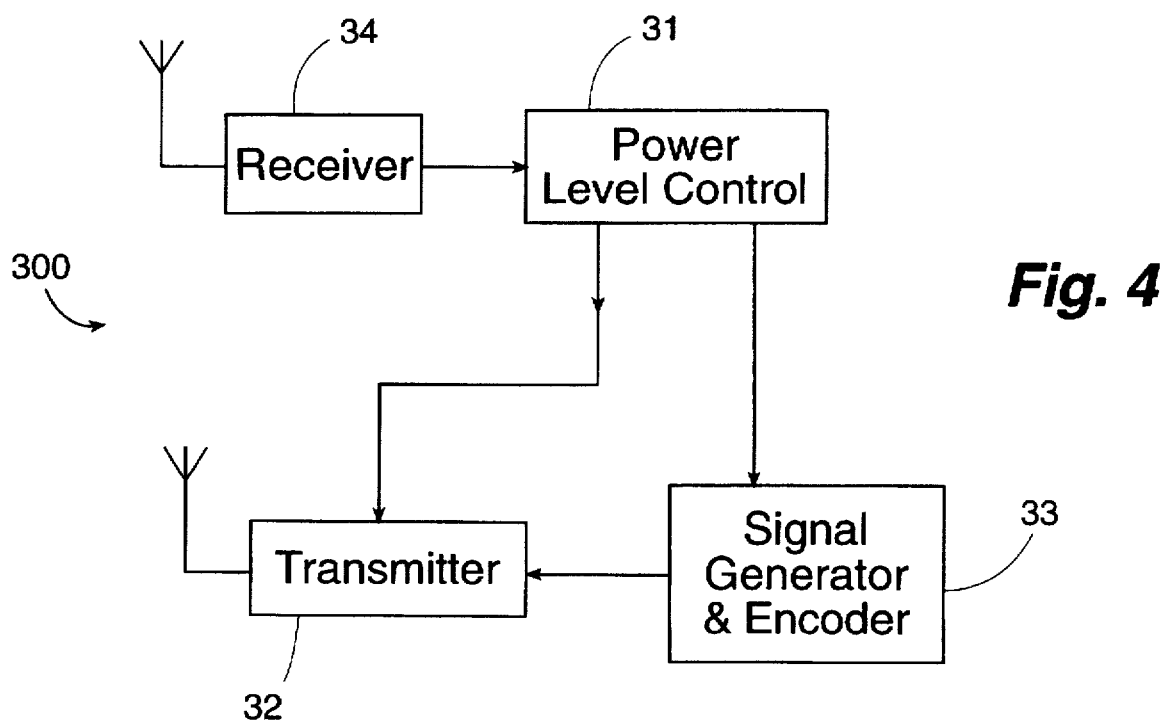
FIG. 4 is a block diagram of an interrogator transceiver according to the invention.

Referring now to FIGS. 1, 3 and 4, the first step in establishing an efficient communication link from interrogator 300 to RFID tag 200 is the step of a power level control circuit 31 setting the transmitter 32 of the interrogator transceiver to a minimum power level (step 1).

Next, a signal to be transmitted is generated by signal generator 33 within the interrogator transceiver (step 2). The frequency and format of this signal is appropriate for sensing by the tag's "wake up" receiver circuit 21. Part of the informational content encoded within this signal may reflect the current transmitter power level.

The signal is then transmitted using the current transmitter power setting (step 3). The first time this is done, the minimum power setting is used.

After the signal is sent, the interrogator must wait for a brief period of time (step 4) for the RFID tag transceiver to respond with a signal of its own.

If the RFID tag transceiver has sent a response and the interrogator receiver circuit 34 has received it, the interrogator will assume that an adequate communication link has been established and will begin communicating information with the RFID tag transceiver (step 5). To improve the signal to noise ratio (SNR) of further communication, the subsequent transmission(s) could be at a predetermined higher level.

If on the other hand, the RFID tag did not send a response or the interrogator did not receive the response, the interrogator will assume that the broadcast output power of the last transmitted signal was too weak. The interrogator will then increase the power level setting on its own transmitter (step 6), may change the informational content of the signal to be sent reflecting the increase in power (step 2), and send another signal (step 3). This signal will be just like the first except for an increase in power and an optional corresponding change in its informational content.

This loop continues until a response from the RFID tag transceiver is received or until the maximum allowable transmitter level is attained (step 7), in which there will be no communication link established, and the entire process can start over (step 1).

Figure 2:
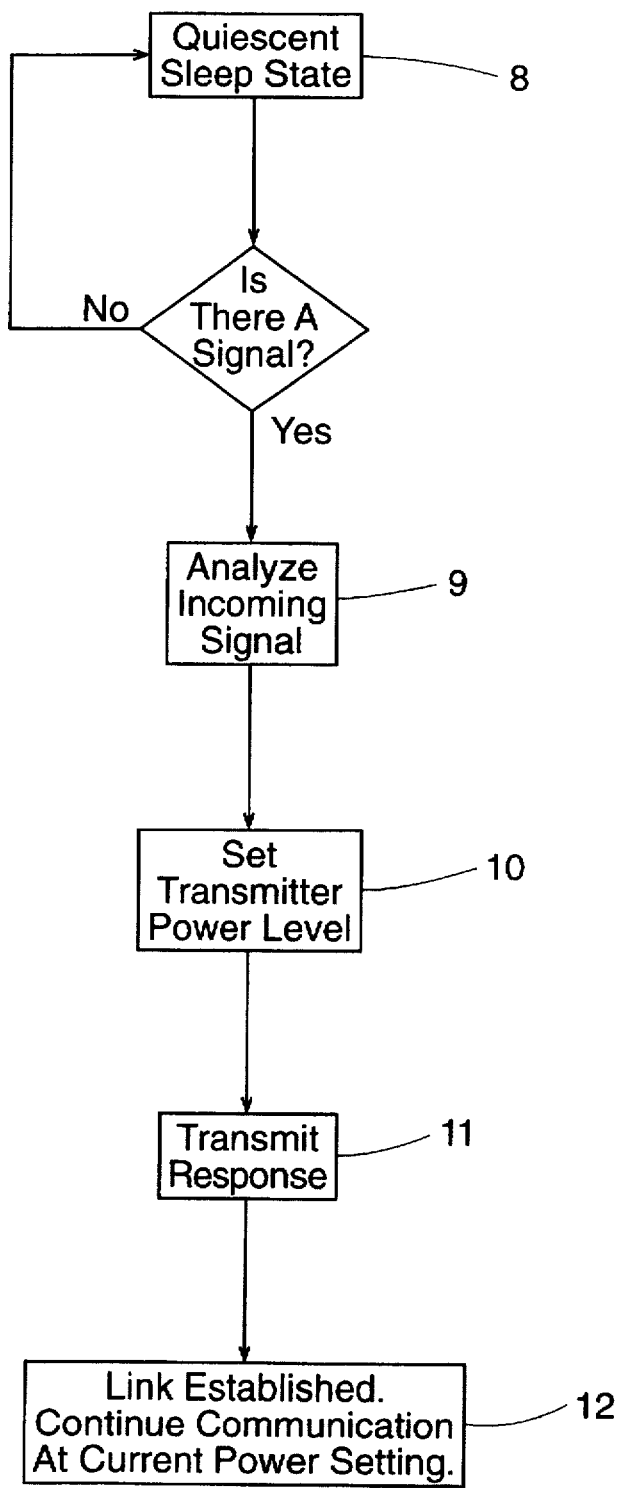
FIG. 2 is a flow chart diagram of the steps taken by the remote RFID tag transceiver in transmitting a response at an efficient power level.

Referring now to FIGS. 2 and 3, the RFID tag 200 is normally in a quiescent sleep state (step 8) using very little power, waiting for a signal from the interrogator.

When a signal of the proper format and frequency arrives, the RFID tag immediately awakens from its sleep and analyzes the incoming signal (step 9). The tag interprets the information in the signal, and its power level control circuit 22 sets the power level (step 10) on its own transmitter 23 according to the amount of power the interrogator used to send the signal. The tag then transmits its response 11.

The communication link between tag and interrogator has been established, and further information can be exchanged between them 12.

In an alternate embodiment, the interrogator first sends out a relatively high power wake-up signal (step 15) to identify those tags within a certain range. Then the interrogator can initiate a similar sequence to establish communication at an efficient power level within the tag.

While the preferred embodiments of the invention have been described, modifications can be made and other embodiments may be devised without departing from the spirit of the invention and the scope of the appended claims.

What is claimed is:

1. A method of interrogating a portable RF transceiver, comprising the steps of:

providing an interrogator RF transceiver;

establishing a minimum power level;

setting a current power level value equal to said minimum power level;

the interrogator transceiver transmitting an interrogation RF signal at said current power level;

after transmitting the interrogation signal, the interrogator transceiver waiting a period of time to receive a response RF signal;

the interrogator transceiver determining whether said period of time has elapsed without the interrogator transceiver receiving said response signal and, only if so, then increasing said current power level value, and repeating the steps of the interrogator transceiver transmitting, waiting, and determining;

providing a portable RF transceiver which is substantially smaller and lighter than the interrogator transceiver;

the portable RF transceiver waiting to receive the interrogation RF signal; and in response to receiving the interrogation signal, the portable transceiver transmitting the response RF signal.

2. A method according to claim 1, wherein:

the establishing step further comprises establishing a maximum allowable power level; and the interrogator determining step further comprises, before performing the increasing step, the interrogator transceiver determining whether the current power level is less than the maximum allowable power level and, if not, then returning to the step of setting the current power level to the minimum power level instead of performing the increasing step and the repeating step.

3. A method according to claim 1, wherein the interrogator transmitting step further comprises the interrogator transceiver encoding the interrogation signal to indicate the current power level value; and the portable transceiver transmitting step further comprises the portable transceiver transmitting the response RF signal at a power level based on the current power level value encoded in the interrogation signal received by the portable transceiver.

4. A method according to claim 1, further comprising the step of:

after the interrogator transceiver receives the response signal from the portable transceiver, the interrogator transceiver transmitting additional signals to the portable transceiver at a power level which exceeds by a predetermined amount the current power level value of the interrogation signal in response to which the portable transceiver transmitted said response signal.

5. A method according to claim 1, further comprising the step of:

before the step of setting the current power level to the minimum power level, the interrogator transceiver transmitting a wake-up signal at a power level substantially higher than the minimum power level.

6. An RF communications system, comprising:

an interrogator transceiver, including a transmitter circuit for transmitting an interrogation RF signal at a controlled power level, a receiver circuit for sensing when the interrogator transceiver receives a response RF signal in response to the interrogation signal, and means for controlling the transmitter circuit of the interrogator transceiver to initially transmit the interrogation signal at a minimum power level, and to then repeatedly transmit the interrogation signal at successively increasing power levels if the receiver circuit does not sense the response signal; and a portable RF transceiver which is substantially smaller and lighter than the interrogator transceiver, including a receiver circuit for sensing when the portable transceiver receives the interrogation RF signal, and a transmitter circuit for transmitting the response RF signal in response to the interrogation signal being sensed by the receiver circuit.

7. A system according to claim 6, wherein the means for controlling the transmitter circuit of the interrogator transceiver further comprises means for controlling said transmitter circuit to transmit the interrogation signal at the minimum power level if the receiver circuit does not sense the response signal after the power level for transmitting the interrogation signal has been increased to a maximum power level.

8. A system according to claim 6, wherein:

the transmitter of the interrogator transceiver further includes means for encoding the interrogation signal to indicate the power level at which the interrogation signal is transmitted; and the portable transceiver further includes means for controlling the transmitter circuit of the portable transceiver to transmit the response message at a power level based on the power level encoded in the interrogation signal received by the portable transceiver.

9. A system according to claim 6, wherein the interrogator transceiver further comprises:

means for controlling the transmitter circuit of the interrogator transceiver, after the receiver circuit of the interrogator transceiver senses the response signal, to transmit additional signals to the portable transceiver at a power level which exceeds by a predetermined amount the power level of the interrogation signal in response to which the portable transceiver transmitted said response signal.

10. A system according to claim 6, wherein the transmitter circuit of the interrogator transceiver further comprises:

means for transmitting a wake-up signal before initially transmitting the interrogation signal, wherein the wake-up signal is transmitted at a power level substantially higher than the minimum power level.

* * * * *